(12) United States Patent
Balkesen et al.

(10) Patent No.: US 8,495,286 B2
(45) Date of Patent: Jul. 23, 2013

(54) WRITE BUFFER FOR IMPROVED DRAM WRITE ACCESS PATTERNS

(75) Inventors: Cagri Balkesen, Zurich (CH); Markus Buehler, Weil im Schoenbuch (DE); Rainer Dorsch, Herrenberg (DE); Guenther Hutzl, Sindelfingen (DE); Michael W. Kaufmann, Stuttgart (DE); Daniel Pfefferkorn, Rostock (DE); David Rohr, Mannheim (DE); Stefanie Scherzinger, Boeblingen (DE); Thomas Schwarz, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/962,774

(22) Filed: Dec. 8, 2010

(65) Prior Publication Data
US 2011/0302367 A1    Dec. 8, 2011

(51) Int. Cl.
*G06F 12/00*    (2006.01)
*G06F 3/00*    (2006.01)

(52) U.S. Cl.
USPC .............. 711/105; 711/159; 711/E12.001; 710/52; 710/753; 710/56; 710/57

(58) Field of Classification Search
USPC ............... 711/105, 159, E12.001; 710/52, 710/53, 56, 57
See application file for complete search history.

(56) References Cited

U.S. PATENT DOCUMENTS

| | | | |
|---|---|---|---|
| 6,189,053 B1 * | 2/2001 | Yasue et al. ................ | 710/52 |
| 6,233,668 B1 * | 5/2001 | Harvey et al. ............... | 711/206 |
| 6,594,785 B1 * | 7/2003 | Gilbertson et al. .......... | 714/48 |
| 6,604,190 B1 * | 8/2003 | Tran ............................ | 712/207 |

* cited by examiner

*Primary Examiner* — Reginald Bragdon
*Assistant Examiner* — Mehdi Namazi
(74) *Attorney, Agent, or Firm* — Robert R. Williams

(57) ABSTRACT

The present invention relates to a method and respective system for operating a DRAM main memory. One buffer line is provided for multiple pages. When writing data to the buffer it is decided which to which buffer-line the data is written to based on its destination main memory address. A tuple consisting of lower memory address and data is stored. Data entered into the buffer-line will be sorted by page in case the line is flushed to the main memory. Sorting the buffer entries results in less page openings and closings, since the data is re-arranged by memory address and therefore in logical order. By using one line for multiple pages only a fraction of memory of a common set-associative cache is needed, thus decreasing the amount of overhead significantly.

6 Claims, 4 Drawing Sheets

WRITE BUFFER FOR IMPROVED DRAM WRITE ACCESS PATTERNS

1. BACKGROUND OF THE INVENTION

1.1. Field of the Invention

The present invention relates to the field of computer main memory control, and in particular to method for operating a DRAM main memory.

1.2. Description and Disadvantages of Prior Art

Dynamic RAM (DRAM) units are currently the prevailing implementation of (main) memory chips, as this memory type is quite cheap and its use has become more and more extensive in the last two decades of processor development, since their great advantage is the high spatial storage density, as only one transistor is needed in a memory cell for storing a single bit. DRAM is usually organized in logical subdivisions called memory pages. A memory page has a physical structure similar to a 2-dimensional table including columns and rows of storage locations. A memory page may contain for example one Megabyte of storage capacity.

Disadvantageously, DRAM storage is quite slow compared to Static RAM (SRAM), and quite energy consuming, since when reading from or writing to a DRAM chip, a whole line of a memory page is preloaded with electrical charge in order to guarantee that a subsequent read or write signal—having a quite low amplitude—reliably reads out or writes the respectively selected bits from/to the preloaded line. This operation, preparative to read or write, is called "page opening". Immediately after the read/write, the page is mostly closed again, except in cases where before page closing it is already known or estimated that a next read or write access can be expected in near future during program run time.

Thus, within the environment of DRAM type main memory the technology of Caching has become a standard to improve read/write-throughput at random access. An overview of this cache structure is given in FIG. 1.

The usual prior art approach to avoid unnecessary page openings/closings is a cache with a cache-line for every memory page (m). Typical cache-line sizes range from 8 to 512 bytes. For every cache-line a number of tickets/tags (n) exists which is decremented for every piece of data supposed to be written to the corresponding page. When all tickets/tags are in use the associated cache-line is flushed to the memory.

This results in less page openings/closings, since the data is written 'en-bloc'. Having a set-associative cache in this manner requires at least a (m×n) cache memory. This amount of fast memory might not be available in every hardware setup, for example in embedded systems, demanding for a different solution to improve memory access bandwidth.

Figure 2:
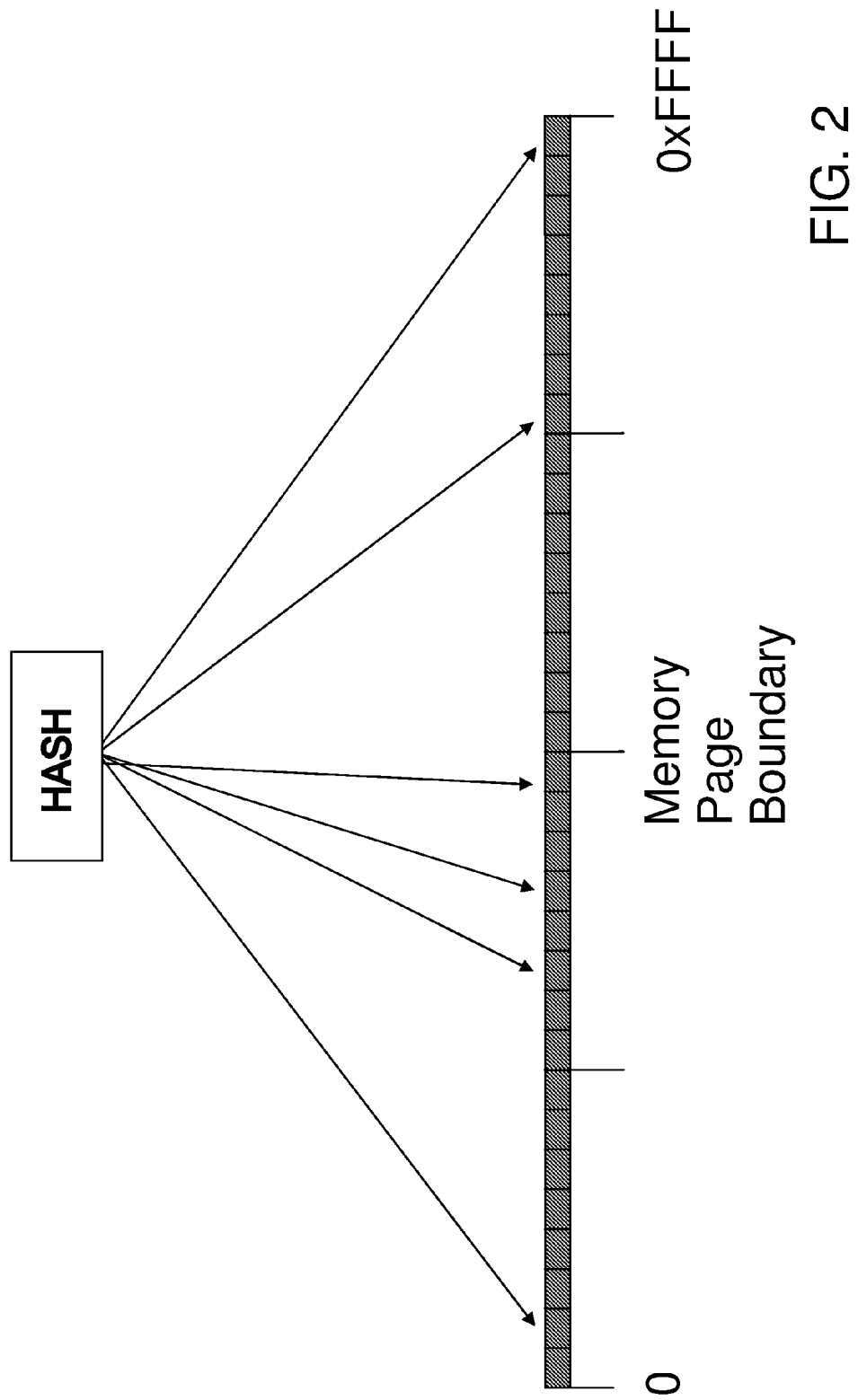

Further, and with reference to FIG. 2, illustrating an address generation via a hash function resulting in a totally random memory access spanning over the whole address range in subsequent memory accesses, a conventional prior art cache as described above would require a vast amount of memory to store enough information in order to write effectively.

In U.S. Pat. No. 4,805,098 different ranks are established to store and manage write data and its address. This ranking however, consumes computing power, as it generates a lot of overhead. Further, independent of the type of computer system in use, in case of totally random access the method is not effectively operating. In particular, in embedded systems having limited computational resources only, this is a clear disadvantage.

1.3. Objectives of the Invention

The objective of the present invention is to provide an alternative method and system for operating a DRAM memory.

2. SUMMARY AND ADVANTAGES OF THE INVENTION

This objective of the invention is achieved by the features stated in enclosed independent claims. Further advantageous arrangements and embodiments of the invention are set forth in the respective dependent claims. Reference should now be made to the appended claims.

According to the broadest aspect the present invention provides a method and respective system for operating a DRAM main memory, wherein the method is characterized by the steps of:

a) operating a so-called memory page concentration buffer operatively connected to said main memory as a particular write buffer, said buffer having a faster access time compared to said DRAM main memory access time, and comprising a plurality (N) of buffer lines, wherein each buffer line may store a plurality of (M) data entries together with a main memory address, preferably a lower part of an associated main memory address, even more preferably an address consisting of memory page ID and internal page offset;

b) in response to a write access request to said DRAM main memory, selecting a buffer line corresponding to the memory page ID for buffering said data of said write request;

c) storing said data of said write access request in an entry of said selected buffer line, if the fill level of said selected buffer line is not beyond a certain predefined fill level, otherwise generating a full signal representing that at least a plurality of P address data need to be written to said DRAM main memory;

d) in case a buffer line comprises data entries of more than one memory page, optionally sorting preferably in response to said full signal, said data entries in said selected buffer line with respect to the main memory addresses, e) selecting said plurality of P data entries from said selected buffer line, and f) writing said plurality of P selected data entries to said DRAM main memory, wherein a single memory page remains open for writing access of said plurality of P data entries, and g) deleting said selected plurality of P data entries from said selected buffer line.

A first aspect of the present invention is thus to provide one buffer-line for multiple memory pages. When writing data to the buffer it is decided to which buffer-line the data is written to based on its destination memory address. A tuple consisting of lower memory address and data is stored requiring some additional memory per item. Data entered into the buffer-line will be sorted by page in case the line is flushed to memory. Sorting the buffer entries results in less page openings and closings, since the data is re-arranged by memory address and therefore in logical order. By using one line for multiple pages only a fraction of memory of a common set-associative cache is needed, thus decreasing the amount of access overhead significantly.

In addition, a substantial amount of power is saved, because the number of energy consuming page openings and closings is significantly reduced. This is specifically important in an environment of embedded devices relying on a power supply with limited capacity yet aiming for a long uptime.

Advantageously, the write access is issued for data residing in an L1 (Level 1) or L2 (Level 2) cache to be written to main memory, wherein the caches are also controlled by the same memory controller.

Further advantageously, the memory page concentration buffer is implemented integrated with an L1 cache or an L2 cache of said main memory and controlled by a common memory controller.

Further advantageously, the operation of the memory page concentration buffer is switched ON and OFF dependent of a control signal generated by a write statistic monitoring unit. So, for example, in an overload situation with no locality prevailing for the current DRAM memory accesses, the inventive buffer can be switched OFF and the SRAM buffer can be used as L1 or L2 cache just like known from diverse prior art.

Basically, the inventive buffer can be operated instead of using existing SRAM cache memory units, or it can be used in addition to said cache memories, and in cooperation with them. If operated in cooperation, the preferable way to operate the inventive page concentration buffer is to use it when data residing in an L1 or L2 cache need to be moved to DRAM main memory.

With respect to embedded systems, a person skilled in the art and having in mind the above basic features of the present invention, will appreciate, that the inventive method may achieve a performance improvement over a standard prior art cache in embedded environments in particular in the following situations:

- The program application in use makes use of highly random access (see example with hash above);
- There is not enough low latency memory capable to handle random accesses well;
- The system has strict power limitations or has to be highly energy conserving.

For applications or use cases with a matching profile the present invention thus provides a solution to achieve increased write throughput with relatively little memory overhead.

Sorting may be performed using prior art SRAM sorting algorithms during free processor cycles. Preferably, the read process is performed similar to a cache miss in prior art. In particular, before a read access to the main memory is performed, the L1 and L2 caches are looked up and/or, respectively, the inventive buffer is looked up.

Basically, the inventive memory controller performing the steps of the inventive method can be implemented on both a hardware chip, or in software, microcode, or the like, or in mixture of both.

3. BRIEF DESCRIPTION OF THE DRAWINGS

Figure 1:
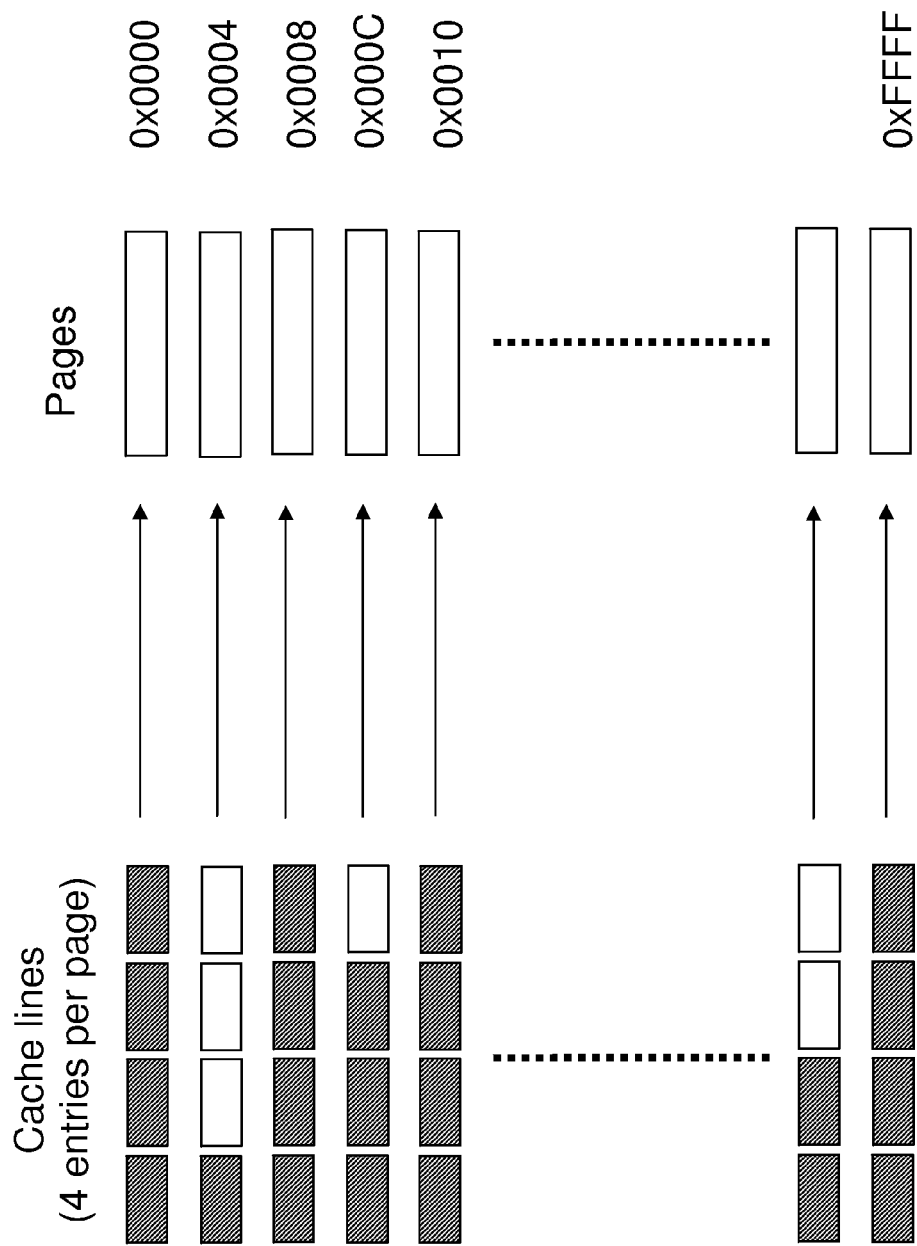
Figure 3:
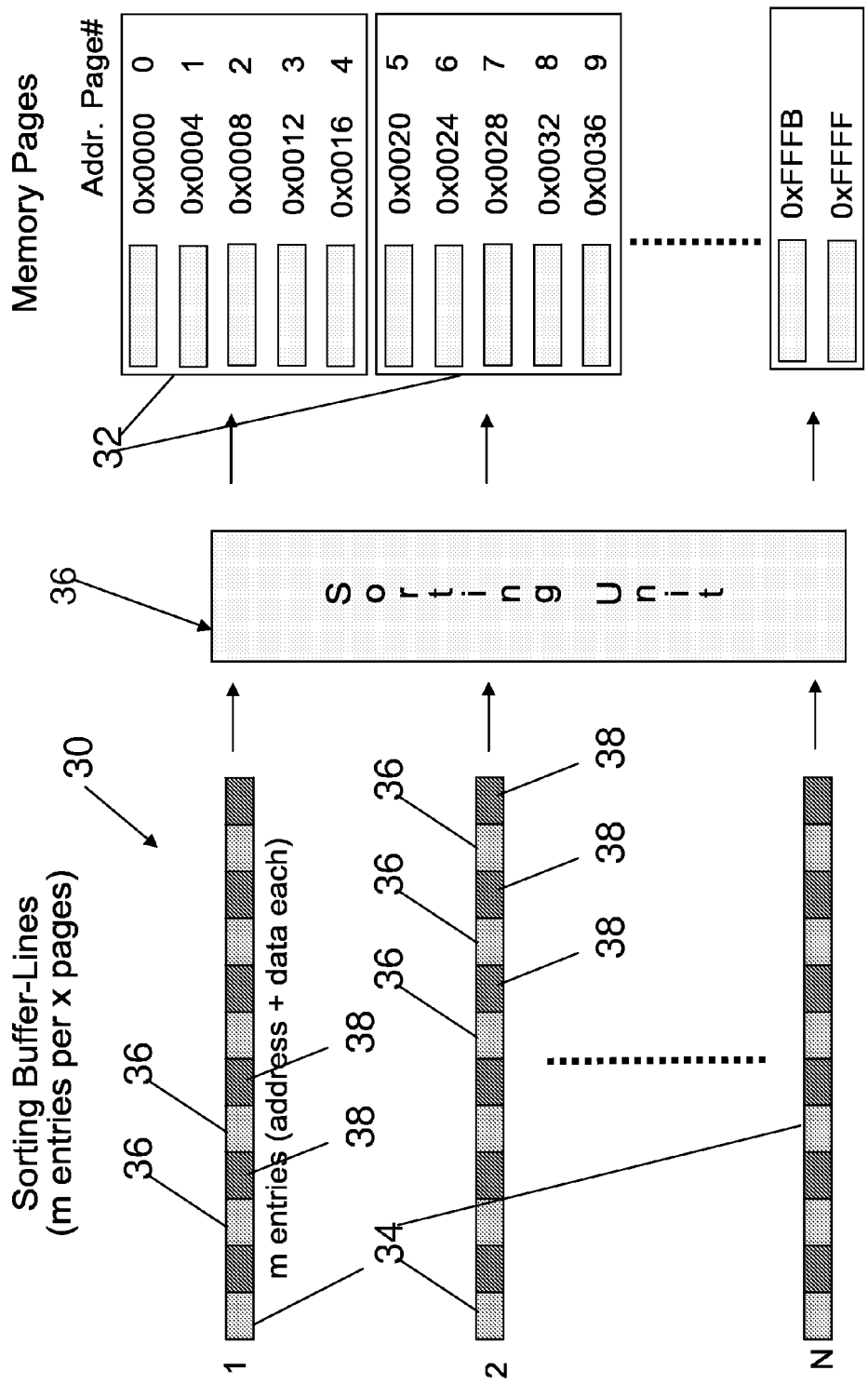
Figure 4:
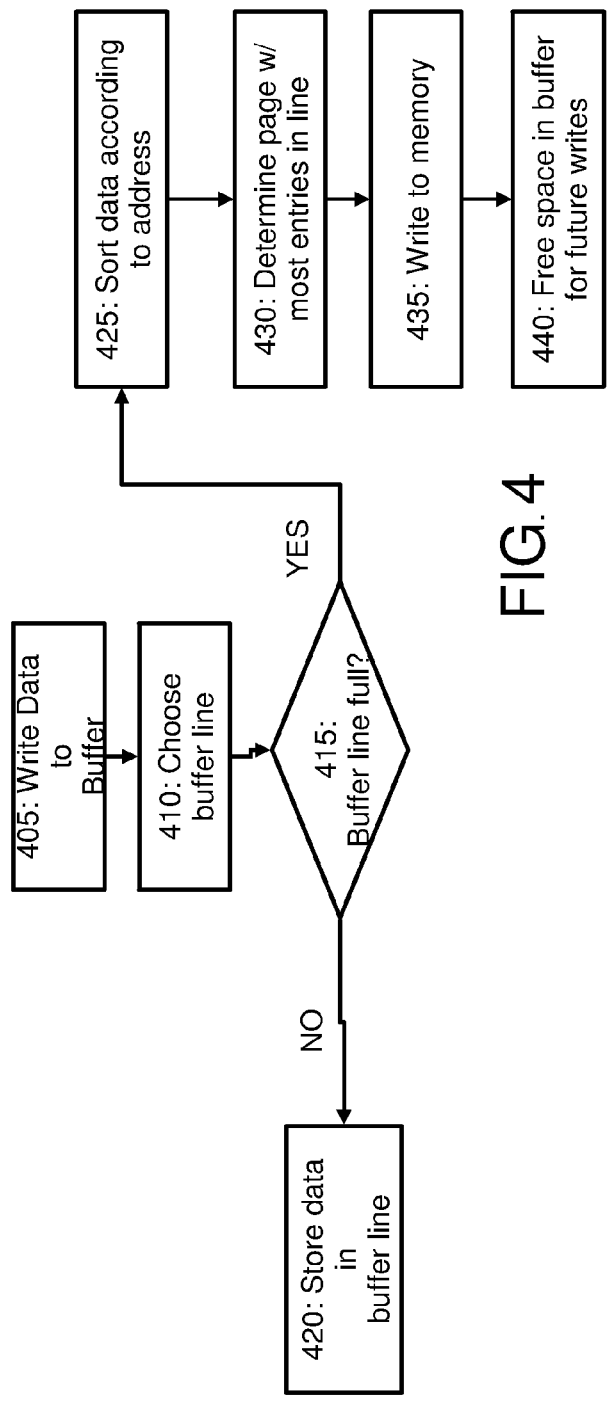
Figure 5:
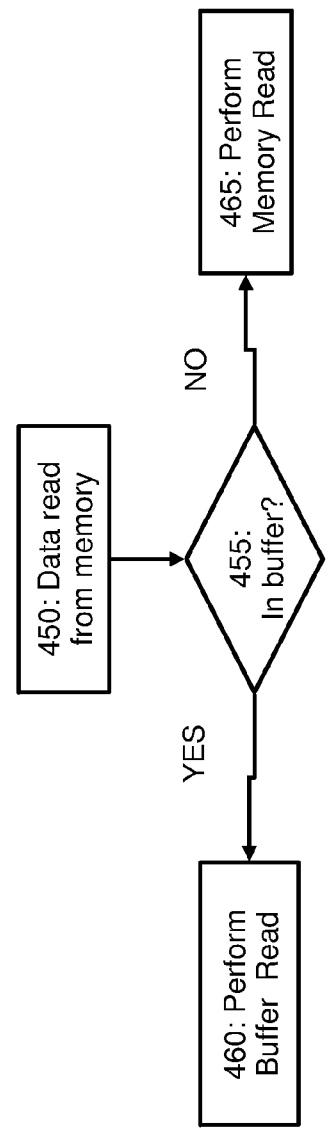

The present invention is illustrated by way of example and is not limited by the shape of the figures of the drawings in which:

FIG. 1 illustrates the most basic structural components of a prior art hardware used for a prior art method, FIG. 2 illustrates an address generation via a hash function resulting in a totally random memory access, FIG. 3 illustrates the most basic structural components of an inventive hardware and software environment used for a preferred embodiment of the inventive method, FIG. 4 illustrates the control flow of the most important steps of a preferred embodiment of the inventive method during a write process to the DRAM, FIG. 5 illustrates the control flow of the most important steps of a preferred embodiment of the inventive method during a read process under primary usage of the inventive buffer.

4. DETAILED DESCRIPTION OF THE PREFERRED EMBODIMENT

With general reference to the figures and with special reference now to FIG. 3 illustrating the most basic structural components of an inventive hardware and software environment used for a preferred embodiment of the inventive method, a buffer-line 34 is created in the inventive buffer 30 for each of a predefined number n of a sequence of memory pages 32. So, the plurality of n pages map to the same line. n is a number resulting from trade-off evaluation between sorting effort and probability for a sequential memory access and can be adapted to the host system. In FIG. 3 the parameter n is chosen to be 5, page 0, ... page 4, page 5, ... page 9, etc. A sorting unit 36 is provided which sorts the entries (address and data each) before they are written to the respective memory page 30 of the DRAM.

Next, the operation of the inventive buffer is described as follows for the case that the entries of more than one memory page are buffered in a single buffer line. This is done with additional reference to FIGS. 4 and 5. When new data is supposed to be written to memory, step 405, the corresponding buffer-line is assigned and selected, step 410, depending on the data's destination memory address. Some lower part of the memory address 36 and corresponding write data 38 are always stored together.

Once a buffer-line is full or its fill level lies beyond a certain level, say 80%, which is tested by the memory controller in a step 415, the memory controller, which is not depicted in FIG. 3, determines in a "best-buffer line" procedure, which memory page has the most entries in the buffer-line and writes those entries to memory, step 435, which represents the main difference to a prior art cache and is the core idea of this proposal. Afterwards the slots in the buffer line are available for storage again, step 440.

Determining in the "best buffer line" procedure, which entries to write can be done by sorting a buffer-line's content with respect to the destination addresses, step 425 and then performing a linear scan to find the page with the maximum number of entries, step 430, or by determination of the maximum page hit count via combinatorial logic.

The relevant entries are then written to memory resulting in an efficient access since the inventive memory controller only needs to open and close a single page per buffer line and to write multiple entries to this single page. This saves energy, and reduces the time necessary per byte being written to the DRAM.

On the other side, there is some delay related to an individual datum to be written to the memory. Delaying the write operation for certain data may result in incoherencies between memory and buffer 30. It is therefore proposed to read data—step 450—not yet flushed to the memory, directly from the inventive buffer 30 itself. In this case the address to read from is evaluated—step 455—and a search is performed in the corresponding buffer-line, step 460.

If the address searched for cannot be found in the buffer, a regular read—step 465—is issued to the memory controller. If the address has been found the data is returned instantly, resulting in a slight speed-up.

Since the present invention focuses on increased throughput when writing to memory, the reading operations take less advantage from this buffer and require some additional hardware overhead to be efficient, for example, to quickly determine whether the buffer currently holds a particular address or not.

In summary, the inventive method is preferable to use in situations with highly random and often occurring write accesses and sequential read operations that are not performed as often or when writes and reads can be separated from each other. The best applicable context would be some kind of phase-based algorithm with a write phase wherein a lot of random accesses occur and a separate read phase.

The inventive method can further be modified in that for example, that the entries of only a single memory page are buffered in a single buffer line. In this case, the sorting step may be omitted and data can be written according to their chronological sequence.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The invention claimed is:

1. A method for operating a DRAM main memory having a DRAM main memory access time, characterized by the steps of:
    a) operating a memory page concentration buffer (30) operatively connected to said DRAM main memory, said buffer (30) having a faster access time compared to said DRAM main memory access time, and comprising a plurality (N) of buffer lines (34), wherein each buffer line (34) may store a plurality of (M) data entries together with a main memory address, consisting of memory page (32) ID and internal page offset;
    b) in response to a write access request to said DRAM main memory, selecting a buffer line (34) corresponding to the memory page ID for buffering said data of said write access request;
    c) storing (420) said data of said write access request in an entry of said selected buffer line, if (415) the fill level of said selected buffer line (34) is not beyond a certain predefined fill level, otherwise generating a FULL signal representing that at least a plurality of P data need to be written to said DRAM main memory;
    in case said selected buffer line (34) comprises data entries of more than one memory page (32), sorting (425), in response to said FULL signal, said data entries in said selected buffer line (34) with respect to the main memory addresses,
    selecting (430) said plurality of P data entries from said selected buffer line,
    writing (435) said plurality of P selected data entries to said DRAM main memory, wherein a single memory page (32) remains open for writing access of said plurality of P data entries, and
    deleting (440) said selected plurality of P data entries from said selected buffer line (34).

2. The method according to claim 1, wherein said write access is issued for data residing in a level-I or level-II cache to be written to main memory.

3. The method according to claim 1, wherein said memory page concentration buffer (30) is implemented integrated with a Level I-Cache or a Level-II Cache of said DRAM main memory and controlled by a common memory controller.

4. The method according to claim 1, wherein the operation of said memory page concentration buffer is switched ON and OFF dependent of a control signal generated by a write statistic monitoring unit.

5. An electronic data processing system having a buffer (30) connectable to a DRAM main memory of said system, wherein said buffer (30) allows for a faster write access than said DRAM main memory, with a plurality (N) of buffer lines, wherein each buffer line may store a plurality of (M) data entries together with a lower part of an associated main memory address, at a memory address comprising a page number and a page internal offset;
    selection means responsive to a write access request to the buffer, which selects a buffer line (34) for the data of said request;
    storing means responsive to said selection means, which stores the data of said write access request if the fill level of said selected buffer line (34) is not beyond a certain level, operatively connected to means for generating a FULL signal;

a sorting unit (30) responsive to said FULL signal, which sorts the data entries in said selected buffer line (34) with respect to the memory pages of the main memory addresses such that neighbouring entries relate to the same memory page;

a flushing unit responsive to said sorting unit, which selects data entries from said selected buffer line (34), writes said selected data entries to the DRAM main memory and deletes said selected entries from said selected buffer line (34).

6. A computer program product comprising a computer useable non-transitory storage medium including a computer readable program, wherein the computer readable program includes a memory controller component that when executed on a computer causes the computer to perform the steps of:

a) operating a memory page concentration buffer (30) operatively connected to a DIMM main memory having a DIMM main memory access time, said buffer (30) having a faster access time compared to said DRAM main memory access time, and comprising a plurality (N) of buffer lines (34), wherein each buffer line (34) may store a plurality of (M) data entries together with a main memory address, at an address consisting of memory page (32) ID and internal page offset;

b) in response to a write access request to said DRAM main memory, selecting a buffer line (34) corresponding to the memory page ID for buffering said data of said write access request;

c) storing (420) said data of said write access request in an entry of said selected buffer line, if (415) the fill level of said selected buffer line (34) is not beyond a certain predefined fill level, otherwise generating a FULL signal representing that at least a plurality of P data need to be written to said DRAM main memory;

in case the selected buffer line (34) comprises data entries of more than one memory page (32), sorting (425), in response to said FULL signal, said data entries in said selected buffer line (34) with respect to the main memory addresses, selecting (430) said plurality of P data entries from said selected buffer line, writing (435) said plurality of P selected data entries to said DRAM main memory, wherein a single memory page (32) remains open for writing access of said plurality of P data entries, and deleting (440) said selected plurality of P data entries from said selected buffer line (34).

* * * * *